United States Patent Office 3,027,352
Patented Mar. 27, 1962

3,027,352
COPOLYMERS
Cheves T. Walling, Upper Montclair, and Frank Brown, Berkeley Heights, N.J., and Kenneth William Bartz, Baytown, Tex., assignors to Celanese Corporation of America, New York, N.Y., a corporation of Delaware
No Drawing. Continuation of application Ser. No. 718,148, Feb. 28, 1958. This application Oct. 19, 1960, Ser. No. 63,491
31 Claims. (Cl. 260—67)

This invention relates to novel copolymers of high thermal stability and particularly to copolymers structurally related to polyoxymethylene. This application is a continuation of our application Serial No. 718,148, filed February 28, 1958, now abandoned.

Polyoxymethylene polymers, having recurring

—$CH_2O$— units, have been known for many years. They may be prepared by the polymerization of anhydrous formaldehyde or by the polymerization of trioxane, which is a cyclic trimer of formaldehyde. Polyoxymethylene varies in thermal stability and in molecular weight, depending on its method of preparation.

Polyoxymethylene of high molecular weight and stability, is useful in the production of molded and extruded objects. In some cases, where prolonged exposure to elevated temperatures is contemplated, it is desirable to increase the thermal stability of the polyoxymethylene to a greater extent than can be obtained by variation of reaction conditions, alone.

It is an object of this invention to provide novel copolymers, structurally related to polyoxymethylene, but having superior resistance to thermal degradation.

It is a further object of this invention to provide a process for preparing copolymers of high resistance to thermal degradation. Other objects will appear hereinafter.

These and other objects are achieved by preparing a polymer having a structure comprising recurring units having the formula $$\left[ -O-\underset{H}{\overset{H}{C}}-(\underset{R_2}{\overset{R_1}{C}})_n - \right]$$

wherein each $R_1$ and $R_2$ is selected from the group consisting of hydrogen, lower alkyl and lower halogen substituted alkyl radicals and wherein $n$ is an integer from zero to three and wherein $n$ is zero in from 85% to 99.9% of the recurring units.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers which may be used are of the formula $$\begin{array}{c} R_1CR_2-O \\ | \quad \quad | \\ R_1CR_2-(R_3)_n \end{array}$$

wherein each $R_1$ and $R_2$ is selected from the group consisting of hydrogen, lower alkyl and lower halogen substituted alkyl radicals and each $R_3$ is selected from the group consisting of methylene, oxymethylene, lower alkyl and haloalkyl substituted methylene and lower alkyl and haloalkyl substituted oxymethylene radicals and $n$ is an integer from zero to three.

The preferred cyclic ethers used in the preparation of the desired copolymers are ethylene oxide and 1, 3 dioxolane which may be designated by the formula $$\begin{array}{c} CH_2-O \\ | \quad \quad | \\ CH_2-(OCH_2)_n \end{array}$$

where $n$ is an integer from zero to two. Other cyclic ethers which may be used are 1, 4 dioxane, trimethylene oxide, tetramethylene oxide, pentamethylene oxide, 1, 2 propylene oxide, 1, 2 butylene oxide, 1, 3 butylene oxide and 2, 2 di(chloromethyl) 1, 3 propylene oxide.

The preferred catalysts used in the preparation of the desired copolymers are the boron fluoride coordinate complexes with organic compounds in which oxygen or sulfur is the donor atom.

The coordinate complexes of boron fluoride may, for example, be a complex with an alcohol, a phenol, an acid, an ether, an acid anhydride, an ester, a ketone, an aldehyde, a dialkyl sulfide or a mercaptan. Boron fluoride etherate, the coordinate complex of boron fluoride with diethyl ether is the preferred coordinate complex. The boron fluoride complexes with phenol and with acetic acid are also very effective. Other boron fluoride complexes which may be used are the complexes with ethanol, with methanol, with propanol, with butanol, with methyl acetate, with ethyl acetate, with phenyl acetate, with benzoic acid, with acetic anhydride, with acetone, with methyl ethyl ketone, with dimethyl ether, with methyl phenyl ether, with acetaldehyde, with chloral, with dimethyl sulfide and with ethyl mercaptan.

The coordinate complex of boron fluoride should be present in the polymerization zone in amounts such that its boron fluoride content is between about 0.001 and about 1.0 weight percent based on the weight of trioxane in the polymerization zone. Preferably, amounts between about 0.003 and about 0.1 weight percent should be used.

The trioxane in the reaction zone is preferably anhydrous or substantially anhydrous. Small amounts of moisture, such as may be present in commercial grade trioxane or may be introduced by contact with atmospheric air will not prevent polymerization, but should be removed for best yields.

In the preferred embodiment of this invention the trioxane, cyclic ether and catalyst are dissolved in a common anhydrous solvent, such as cyclohexane and permitted to react in a sealed reaction zone. The temperature in the reaction zone may vary from about 50° C. to about 90° C. The period of reaction may vary from about 5 minutes to about one hour. Pressures from subatmospheric to about 100 atmospheres, or more, may be used, although atmospheric pressure is preferred.

The copolymers produced from the preferred cyclic ethers in accordance with this invention have a structure substantially composed of oxymethylene and oxyethylene groups in a ratio from about 6 to 1 to about 1000 to 1.

The copolymers produced are normally solid having melting points from somewhat lower than up to the melting point of the corresponding polyoxymethylene homopolymer, the preferred copolymers having melting points not less than 150° C. The copolymers have a weight loss when maintained in an open vessel at a temperature of 225±5° C. for 120 minutes not greater than 40 weight percent, as contrasted with the homopolymer which has a weight loss in excess of 80 weight percent.

*Example 1*

25.0 g. of trioxane was placed into a test tube, 23 cm. in length, equipped with a ground glass joint. 25.0 g. of cyclohexane was added and the tube was placed into a solid carbon dioxide-acetone bath at a temperature of −60 to −80° C. until solidification occurred. Thereafter 0.10 ml. of boron fluoride etherate was added, the tube was sealed and placed upon a rotor which was immersed in a water bath. The tube was left in the bath for a period of four hours at a temperature ranging from between 66-68° C. The tube was opened and the polymer was removed. Thereupon the polymer was washed successively with hot 5% sodium carbonate, hot water and finally ether. The polymer was dried overnight in an air circulated oven at a temperature of 63° C. 6 grams of polymer was recovered.

*Example 2*

25.0 g. of trioxane was placed into a test tube, 23 cm. in length, equipped with a ground glass joint. 25.0 g. of cyclohexane was added and the tube was placed into a dry ice-acetone bath at a temperature of −60 to −80° C. until solidification occurred. 0.03 ml. of ethylene oxide was added followed by 0.1 ml. of boron fluoride etherate. The tube was sealed and placed upon a rotor which was immersed in a water bath. The tube was left in the bath for a period of four hours at a temperature ranging between 66–68° C. The tube was opened and the polymer was removed. Thereupon the polymer was washed successively with hot 5% sodium carbonate, hot water and finally ether. The polymer was dried overnight in an air circulated oven.

*Example 3*

Experiment 2 was repeated varying the quantities of material as follows:

| | |
|---|---|
| Trioxane _____g__ | 24.75 |
| Cyclohexane _____g__ | 25.0 |
| Ethylene oxide _____ml__ | 0.25 |
| Boron fluoride etherate _____ml__ | 0.10 |

5 grams of polymer was recovered.

*Example 4*

Experiment 2 was repeated varying the quantities of material as follows:

| | |
|---|---|
| Trioxane _____g__ | 23.75 |
| Cyclohexane _____g__ | 25.0 |
| Ethylene oxide _____ml__ | 1.25 |
| Boron fluoride etherate _____ml__ | 0.10 |

4½ grams of polymer was recovered.

*Example 5*

25.0 g. of trioxane was placed into a test tube, 23 cm. in length, equipped with a ground glass joint. 25.0 g. of cyclohexane was added and the tube was placed into a Dry Ice-acetone bath at a temperature of −60 to −80° C. until solidification occurred. 0.03 ml. of dioxolane was added followed by 0.10 ml. of boron fluoride etherate. The tube was sealed and placed upon a rotor which was immersed in a water bath. The tube was left in the bath for a period of four hours at a temperature ranging between 66–68° C. The tube was opened and the polymer was removed. Thereupon the polymer was washed successively with hot 5% sodium carbonate, hot water and finally methylene chloride. The polymer was dried overnight in an air circulated oven at a temperature of 63° C. 5 grams of polymer was obtained.

*Example 6*

Experiment 5 was repeated varying the quantity of materials as follows:

| | |
|---|---|
| Trioxane _____g__ | 24.75 |
| Cyclohexane _____g__ | 25.0 |
| Dioxolane _____ml__ | 0.25 |
| Boron fluoride etherate _____ml__ | 0.10 |

*Example 7*

Experiment 5 was repeated varying the quantity of materials as follows:

| | |
|---|---|
| Trioxane _____g__ | 23.75 |
| Cyclohexane _____g__ | 25.0 |
| Dioxolane _____ml__ | 1.25 |
| Boron fluoride etherate _____ml__ | 0.10 |

The products of the above-described examples were compared with respect to melting point and with respect to weight loss when maintained at a temperature of 225±5° C. for a period of 120 minutes, as shown below:

| Example | M.P., °C. | g. Trioxane | ml. Ethylene oxide | ml. Dioxolane | Percent Wt. loss |
|---|---|---|---|---|---|
| 1 | 190-195 | 25.00 | 0 | | 84.1 |
| 2 | 189 | 25.00 | .03 | | 28.9 |
| 3 | 184 | 24.75 | .25 | | 23.7 |
| 4 | 173 | 23.75 | 1.25 | | 32.4 |
| 5 | 195 | 25.00 | | .03 | 27.8 |
| 6 | 180 | 24.75 | | .25 | 33.2 |
| 7 | 169 | 23.75 | | 1.25 | 38.8 |

*Example 8*

Forty grams of trioxane was blended with sufficient 1, 3 dioxolane to produce a mixture having 47 oxymethylene units for each oxyethylene unit. The mixture was charged into a reaction tube 18 inches long and having an internal diameter of 15 millimeters along with 0.36 weight percent of boron fluoride etherate. The reaction tube was placed in a boiling water bath and heated for 0.37 hours. The polymer formed was mechanically removed from the reaction tube and washed twice with 250 ml. portions of acetone in a blender, filtering after each wash. The polymer was then washed 5 times with 250 ml. portions of cold water in a blender, filtering after each wash. It was then four times heated to boiling in 250 ml. portion of water and filtered and finally washed twice with 250 ml. portions of acetone, filtered and air dried.

The yield of washed polymer was 97.3 weight percent. The polymer had a melting point of 150 to 155° C. and a degradation of only 0.11 weight percent per minute, determined on a one gram sample measured at 222° C. in a small ampule open to the atmosphere through a single capillary tip.

*Example 9*

Example 8 was repeated, using enough dioxolane in the mixture to provide one oxyethylene group for each 8.45 oxymethylene groups. The catalyst comprised only 0.089 weight percent of the mixture and the reaction period was 2.16 hours. A polymer was produced in a yield of 42.5 percent by weight and had a melting point from 158° to 163° C. Its degradation rate, when measured as above was only 0.06 weight percent per minute.

*Example 10*

Example 8 was repeated, using enough dioxolane in the mixture to provide one oxyethylene group for each 3.5 oxymethylene groups. The catalyst comprised 0.187 weight percent and the reaction period was one hour. A polymer was produced in a yield of 33.4 weight percent, but it was a semi-melt at room temperature. This example illustrates the effect of introducing too much of the cyclic ether into the polymerization.

It is to be understood that the foregoing detailed description is given merely by way of illustration and that many variations may be made therein without departing from the spirit of our invention.

Having described our invention, what we desire to secure from Letters Patent is:

1. A normally solid, substantially water-insoluble copolymer whose repeating units consist essentially of (A) $-OCH_2-$ groups interspersed with (B)

$$-O\overset{R_2}{\underset{R_1}{C}}-\overset{R_2}{\underset{R_1}{C}}-(R_3)_n-$$

groups where each $R_1$ and $R_2$ is selected from the group consisting of hydrogen, and lower alkyl radicals and halogen substituted lower alkyl radicals, each $R_3$ is selected from the group consisting of methylene, oxymethylene, lower alkyl and haloalkyl substituted methylene and lower alkyl and haloalkyl substituted oxymethylene radicals and $n$ is an integer from zero to three, each lower alkyl radical having one to two carbon atoms, said (A) units constituting 85% to 99.9% of the recurring units, said (B) units being incorporated during the step of copolymerization to produce said copolymer by the opening of the ring of a cyclic ether having adjacent carbon atoms by the breaking of an oxygen to carbon linkage.

2. The polymer of claim 1, said polymer having a melting point not less than about 150° C. and having a weight loss not higher than about 40% when maintained at about 225° C. for 120 minutes in an open vessel.

3. A normally solid substantially water-insoluble copolymer of trioxane with from about 0.1 to about 15 mole percent of a cyclic ether having a least two adjacent carbon atoms.

4. A normally solid substantially water-insoluble copolymer of trioxane with from about 0.1 to about 15 mole percent of a cyclic ether having the structure

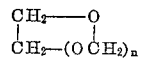

where $n$ is an integer from zero to 2.

5. A normally solid, substantially water-insoluble copolymer of trioxane with from about 0.1 to about 15 mole percent of ethylene oxide.

6. A normally solid, substantially water-insoluble copolymer of trioxane with from about 0.1 to about 15 mole percent of dioxolane.

7. A method for preparing a polymer of high thermal stability which comprises copolymerizing trioxane with from about 0.1 to about 15 mole percent of a cyclic ether having the structure

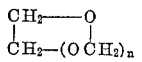

where $n$ is an integer from zero to 2 and recovering a normally solid substantially water-insoluble copolymer of trioxane and said cyclic ether.

8. A method of preparing a polymer of high thermal stability which comprises copolymerizing trioxane with from about 0.1 to about 15 mole percent of ethylene oxide and recovering a normally solid substantially water-insoluble copolymer of trioxane and said ethylene oxide.

9. A method of preparing a polymer of high thermal stability which comprises copolymerizing trioxane with from about 0.1 to about 15 mole percent of 1,3 dioxolane and recovering a normally solid substantially water-insoluble copolymer of trioxane and said dioxolane.

10. A method of preparing a polymer of high thermal stability which comprises copolymerizing trioxane with from about 0.1 to about 15 mole percent of a cyclic ether having the structure

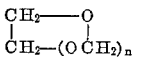

where $n$ is an integer from zero to 2 in contact with a catalytic amount of a catalyst comprising boron fluoride coordinate complex with an organic compound in which the donor atom is a member of the group consisting of oxygen and sulfur.

11. The method of claim 10 wherein the catalyst is boron fluoride diethyl etherate.

12. The method of claim 10 wherein the cyclic ether is ethylene oxide.

13. The method of claim 10, wherein the cyclic ether is 1,3 dioxolane.

14. A method for preparing a polymer of high thermal stability which comprises copolymerizing trioxane with from about 0.1 to about 15 mol percent of a cyclic ether having at least two adjacent carbon atoms.

15. The method of claim 10 wherein said catalyst is present in an amount such that its boron fluoride content is between 0.001 and 1.0 weight percent based on the weight of trioxane.

16. The method of claim 15 wherein copolymerization takes place under substantially anhydrous conditions at a temperature between 50° and 90° C. over a period between 5 minutes and 1 hour.

17. A molded article composed of a normally solid, substantially water-insoluble copolymer of trioxane with from about 0.1 to about 15 mole percent of a cyclic ether having the structure

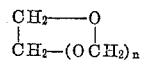

where $n$ is an integer from zero to 2.

18. An extruded article composed of a normally solid, substantially water-insoluble copolymer of trioxane with from about 0.1 to about 15 mole percent of a cyclic ether having the structure

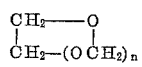

where $n$ is an integer from zero to 2.

19. A copolymer as set forth in claim 1 in which $R_1$ and $R_2$ are hydrogen and $R_3$ is methylene.

20. A copolymer as set forth in claim 1 in which the (B) units are oxyethylene units and the ratio of (A) to (B) units is about 6 to 1 to about 1000 to 1.

21. A normally solid, substantially water-insoluble copolymer whose repeating units consist essentially of (A) —OCH$_2$— groups interspersed with (B)

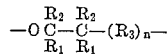

groups where each $R_1$ and $R_2$ is selected from the group consisting of hydrogen, and lower alkyl radicals and halogen substituted lower alkyl radicals, each $R_3$ is selected from the group consisting of methylene, oxymethylene, lower alkyl and haloalkyl substituted methylene and lower alkyl and haloalkyl substituted oxymethylene radicals and $n$ is an integer from zero to three, each lower alkyl radical having one to two carbon atoms, said (A) units constituting 85% to 99.9% of the recurring units, the source of said (B) units being an oxygen containing monomer having a molecular weight not above 155.

22. A normally solid, substantially water-insoluble copolymer whose repeating units consist essentially of (A) —OCH$_2$— groups interspersed with (B)

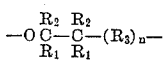

groups where each $R_1$ and $R_2$ is selected from the group consisting of hydrogen, and lower alkyl radicals and halogen substituted lower alkyl radicals, each $R_3$ is selected from the group consisting of methylene, oxymethylene, lower alkyl and haloalkyl substituted methylene and lower alkyl and haloalkyl substituted oxymethylene radicals and $n$ is an integer from zero to three, each lower alkyl radical having one to two carbon atoms, said (A) units constituting 85% to 99.9% of the recurring units, said copolymer having been prepared from monomers having molecular weights below 155.

23. A normally solid, substantially water-insoluble copolymer whose repeating units comprise (A) —OCH$_2$— groups interspersed with (B)

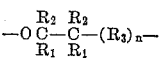

groups where each $R_1$ and $R_2$ is selected from the group consisting of hydrogen, and lower alkyl radicals and halogen substituted lower alkyl radicals, each $R_3$ is selected from the group consisting of methylene, oxymethylene, lower alkyl and haloalkyl substituted methylene and lower alkyl and haloalkyl substituted oxymethylene radicals and $n$ is an integer from zero to three, each lower alkyl radical having one to two carbon atoms, said (A) units constituting 85% to 99.9% of the recurring units, said (B) units being incorporated during the step of copolymerization to produce said copolymer by the opening of the ring of a cyclic ether having adjacent carbon atoms by the breaking of an oxygen to carbon linkage, the proportion of said (A) units by weight in said copolymer being about 80% to 99.85% and the proportion by weight of said (B) units in said copolymer being about 0.15% to 20%, the proportion of said B units being such that the copolymer has a weight loss of 225° C. less than half that of the corresponding polymer not containing said B units, said weight loss at 225° C. being measured on a product maintained in an open vessel at a temperature of 225±5° C. for 120 minutes.

24. A normally solid, substantially water-insoluble copolymer whose repeating units comprise (A) —$OCH_2$— groups interspersed with (B)

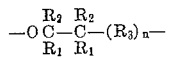

groups where each $R_1$ and $R_2$ is selected from the group consisting of hydrogen, and lower alkyl radicals and halogen substituted lower alkyl radicals, each $R_3$ is selected from the group consisting of methylene, oxymethylene, lower alkyl and haloalkyl substituted methylene and lower alkyl and haloalkyl substituted oxymethylene radicals and $n$ is an integer from zero to three, each lower alkyl radical having one to two carbon atoms, said (A) units constituting 85% to 99.9% of the recurring units, the source of said (B) units being an oxygen containing monomer having a molecular weight not above 155, the proportion of said (A) units by weight in said copolymer being about 80% to 99.85% and the proportion by weight of said (B) units in said copolymer being about 0.15% to 20%, the proportion of said B units being such that the copolymer has a weight loss at 225° C. less than half that of the corresponding polymer not containing said B units, said weight loss at 225° C. being measured on a product maintained in an open vessel at a temperature of 225±5° C. for 120 minutes.

25. A normally solid, substantially water-insoluble copolymer whose repeating units comprise (A) —$OCH_2$— groups interspersed with (B)

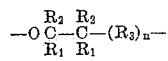

groups where each $R_1$ and $R_2$ is selected from the group consisting of hydrogen, and lower alkyl radicals and halogen substituted lower alkyl radicals, each $R_3$ is selected from the group consisting of methylene, oxymethylene, lower alkyl and haloalkyl substituted methylene and lower alkyl and haloalkyl substituted oxymethylene radicals and $n$ is an integer from zero to three, each lower alkyl radical having one to two carbon atoms, said (A) units constituting 85% to 99.9% of the recurring units, said copolymer having been prepared from monomers having molecular weights below 155, the proportion of said (A) units by weight in said copolymer being about 80% to 99.85% and the proportion by weight of said (B) units in said copolymer being about 0.15% to 20%, the proportion of said B units being such that the copolymer has a weight loss at 225° C. less than half that of the corresponding polymer not containing said B units, said weight loss at 225° C. being measured on a product maintained in an open vessel at a temperature of 225±5° C. for 120 minutes.

26. A copolymer as set forth in claim 24 in which the (B) units are oxyethylene units.

27. An article molded of the copolymer set forth in claim 26.

28. An article extruded of the copolymer set forth in claim 20.

29. An article molded of the copolymer set forth in claim 4.

30. A copolymer as set forth in claim 1 in which the (B) groups are oxyethylene groups.

31. A normally solid substantially water-insoluble copolymer of
(A) trioxane and
(B) a member of the group consisting of ethylene oxide and 1,3-dioxolane, said (A) and (B) being copolymerized in the relative proportions of 23.75 to 25.00 grams of (A) for each 1.25 to 0.03 ml., respectively, of (B).

References Cited in the file of this patent
UNITED STATES PATENTS

| | | |
|---|---|---|
| 2,475,610 | Gresham | July 12, 1949 |
| 2,795,571 | Schneider | June 11, 1957 |

FOREIGN PATENTS

| | | |
|---|---|---|
| 582,945 | Canada | Sept. 8, 1959 |